United States Patent
Lockridge et al.

(10) Patent No.: US 7,895,360 B2
(45) Date of Patent: Feb. 22, 2011

(54) METHOD AND APPARATUS FOR ADAPTIVELY CONFIGURING A ROUTER

(75) Inventors: Terry Wayne Lockridge, Indianapolis, IN (US); Robert Eugene Trzybinski, Indianapolis, IN (US); Douglas Harry Morgan Hutchins, Carmel, IN (US)

(73) Assignee: Thomson Licensing, Boulogne-Billancourt (FR)

(*) Notice: Subject to any disclaimer, the term of this patent is extended or adjusted under 35 U.S.C. 154(b) by 2715 days.

(21) Appl. No.: 10/223,844

(22) Filed: Aug. 20, 2002

(65) Prior Publication Data

US 2003/0110240 A1 Jun. 12, 2003

Related U.S. Application Data

(60) Provisional application No. 60/340,903, filed on Dec. 12, 2001.

(51) Int. Cl.
*G06F 15/173* (2006.01)
*H04L 12/28* (2006.01)
(52) U.S. Cl. .................. 709/242; 709/238; 370/395.54
(58) Field of Classification Search .................. 709/238, 709/242, 244, 220, 249; 370/395.54, 401
See application file for complete search history.

(56) References Cited

U.S. PATENT DOCUMENTS

| | | | |
|---|---|---|---|
| 5,420,862 A | 5/1995 | Perlman | |
| 5,557,748 A | 9/1996 | Norris | 395/200.1 |
| 5,854,901 A | 12/1998 | Cole et al. | |
| 6,012,088 A | 1/2000 | Li et al. | 709/219 |
| 6,028,846 A | 2/2000 | Cain | 370/250 |
| 6,049,826 A | 4/2000 | Beser | 709/222 |
| 6,130,892 A | 10/2000 | Short et al. | |
| 6,289,377 B1 | 9/2001 | Lalwaney et al. | 709/222 |
| 6,295,276 B1 | 9/2001 | Datta et al. | 370/218 |
| 6,378,005 B1 | 4/2002 | Hyder et al. | 709/321 |
| 6,393,494 B1 | 5/2002 | Hyder et al. | 709/321 |

FOREIGN PATENT DOCUMENTS

| | | |
|---|---|---|
| JP | 5-207022 | 8/1993 |
| JP | 2001-292168 | 10/2001 |

OTHER PUBLICATIONS

Plummer, An Ethernet Address Resolution Protocol, Nov. 1982, IETF, RFC 826, pp. 8-9.*
Mogul, Internet Standard Subnetting Procedure, Aug. 1985, IETF, RFC 950, p. 8.*
PCT Search Report dated: Mar. 4, 2003.
Japanese Abstract, JP 5-207022, found at: http://v3.espacenet.com/textdoc?DB=EPODOC&IDX=JP5207022&F=0, Aug. 18, 2008. (See Sheet 1, Foreign Patent Documents, Japanese Patent Publication.
Japanese Abstract, JP 2001-292168, found at:: http://v3.espacenet.com/textdoc?DB=EPODOC&IDX=JP2001292168&F=0, Aug. 18, 2008. (See Sheet 1, Foreign Patent Documents, Japanese Patent Publication.

* cited by examiner

*Primary Examiner*—Peling A Shaw
(74) *Attorney, Agent, or Firm*—Robert D. Shedd; Paul P. Kiel; Guy H. Eriksen

(57) ABSTRACT

A method, device, and computer readable medium for adaptively configuring a router monitors data packets propagating in a network to detect a statically configured network device. A network interface within the router is adapted to network parameters associated with the statically configured network device to operatively couple the statically configured network device to the router.

19 Claims, 3 Drawing Sheets

METHOD AND APPARATUS FOR ADAPTIVELY CONFIGURING A ROUTER

CROSS-REFERENCE TO RELATED APPLICATIONS

This application claims benefit of U.S. provisional patent application Ser. No. 60/340,903, filed Dec. 12, 2001, which is herein incorporated by reference.

FIELD OF THE INVENTION

The present invention generally relates to communication systems and, more particularly, to a method and apparatus for adaptively configuring a networked communication device.

BACKGROUND OF THE INVENTION

Purchasers of routers for networking computers in a home, small office, or distribution center, for example, frequently return the routers after purchase. The reason for the high-return rate is that many customers/users/purchasers are not network savvy and cannot get the router configured properly. This problem commonly occurs when the customer is attempting to network existing personal computers (PCs) together through a broadband modem using a router.

For legacy equipment, and for some new broadband installations, a service provider typically sends a technician to install and connect a customer's PC to a broadband modem. Subsequently, the customer may decide to insert a router to network their PCs and/or add firewall, for example. These must be properly configured. For example, some PCs may be dynamically configurable, whereas other may employ a static configuration. Many customers try to configure the router, fail to do so, and then return the router after the configuration failure. This creates a high product return rate due to the difficulty of installation.

SUMMARY OF THE INVENTION

The present invention is a method, apparatus, and computer readable medium for adaptively configuring a router. In one embodiment, the present invention monitors data packets propagating in a network, such as a local area network (LAN), to detect a statically configured network device coupled to the router. A network interface within the router is adapted to network parameters associated with the statically configured network device to operatively couple the statically configured network device to the router. Once configured, the router allows the statically configured network device to communicate with other devices in the network, as well as other networks coupled to the router. In this manner, the present invention advantageously circumvents the need to manually configure the router and/or change the network settings of a statically configured network device, when coupling the statically configured network device to the router.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention is a method and apparatus for adaptively configuring a router in a communication system. The present invention will be described within the context of a router coupled between a home network and a broadband Internet service provider (ISP). Those skilled in the art, however, will appreciate that the present invention can be advantageously employed in any communication system in which various network devices are coupled to a network interface, such as a router or a gateway server. Thus, the present invention has broad applicability beyond the network systems described herein.

Figure 1:
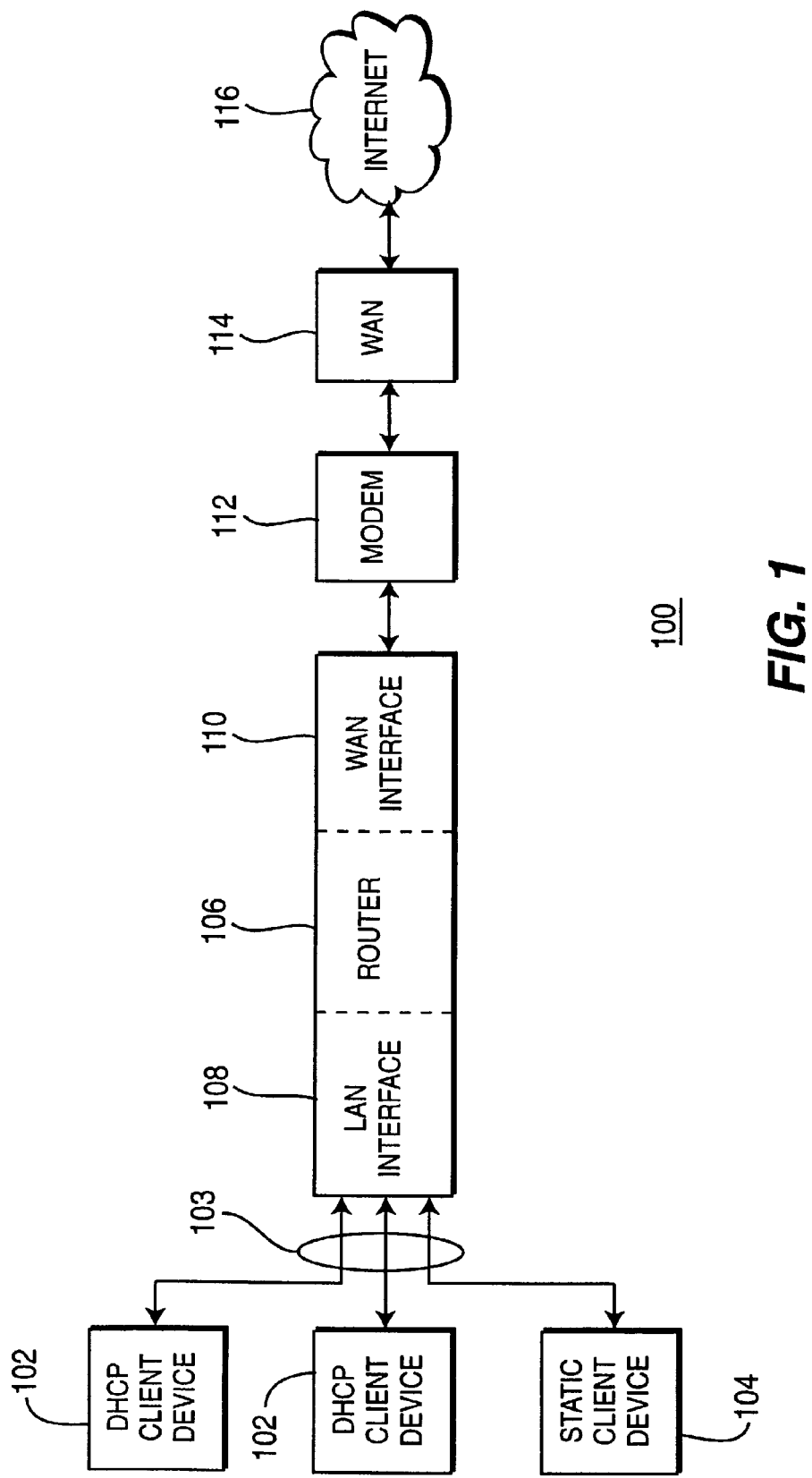
FIG. 1 depicts a high-level block diagram of an illustrative communication system suitable for use with the present invention.

FIG. 1 depicts a high-level block diagram of an illustrative communication system 100 for use with the present invention. As shown, the communication system 100 comprises a local area network (LAN) 103, a router 106, a modem 112, and a wide area network (WAN) 114. The LAN 103 comprises various network devices, such as dynamically configured client devices 102 and a statically configured client device 104. The WAN 114 comprises, for example, a domain name server (DNS) and a gateway (not shown) for connection to another network 116, such as the Internet. The dynamically configured client devices 102 are network devices that receive at least a portion of the network parameters necessary for operation from another network device, for example, the router 106. In contrast, the statically configured client device 104 is a network device having static network parameters that do not change absent manual intervention by a user, for example. Exemplary network parameters associated with client devices 102 and 104 include an internet protocol (IP) address, a medium access control (MAC) address, a subnet mask, a domain name, a host name, a gateway IP address, and one or more DNS IP addresses.

As used herein, the term router means any device that allows network devices to communicate amongst themselves and/or other networks including, for example, a gateway server. The router 106 comprises a LAN interface 108 coupled to the LAN 103, and a WAN interface 110 coupled to the WAN 114. The LAN interface 108 comprises several physical ports for connection to the client devices 102 and 104, whereas the WAN interface 110 comprises a physical port for connection to the modem 112. The modem 112 comprises a cable modem, a digital subscriber line (DSL) modem, or like type broadband modem known to those skilled in the art. The modem 112 may also comprise a narrowband device, such as a dial-up modem.

Briefly stated, the router 106 allows the client devices 102 to communicate with the client device 104, and also provides an interface between the client devices 102 and 104 and the network 116, through the modem 112 and the WAN 114. In order to operatively couple the client devices 102 and 104 to the router 106, the LAN interface 108 is configured with network parameters associated with the client devices 102 and 104. In particular, the LAN interface 108 provides network parameters to the dynamically configured client devices 102 via dynamic host configuration protocol (DHCP), or like type dynamic configuration protocols known to those skilled in the art. As described above, the statically configured client device 104 is assigned network parameters that do not change absent intervention by a user. In accordance with the present invention, the router 106 adapts the LAN interface 108 to the network parameters associated with the statically configured client device 104 by monitoring network traffic passing through the router 106. As such, the present invention advantageously obviates the need for a user to manually configure the router 106, and/or to manually change the network settings of the statically configured client device 104 when coupled to the router 106.

Figure 2:
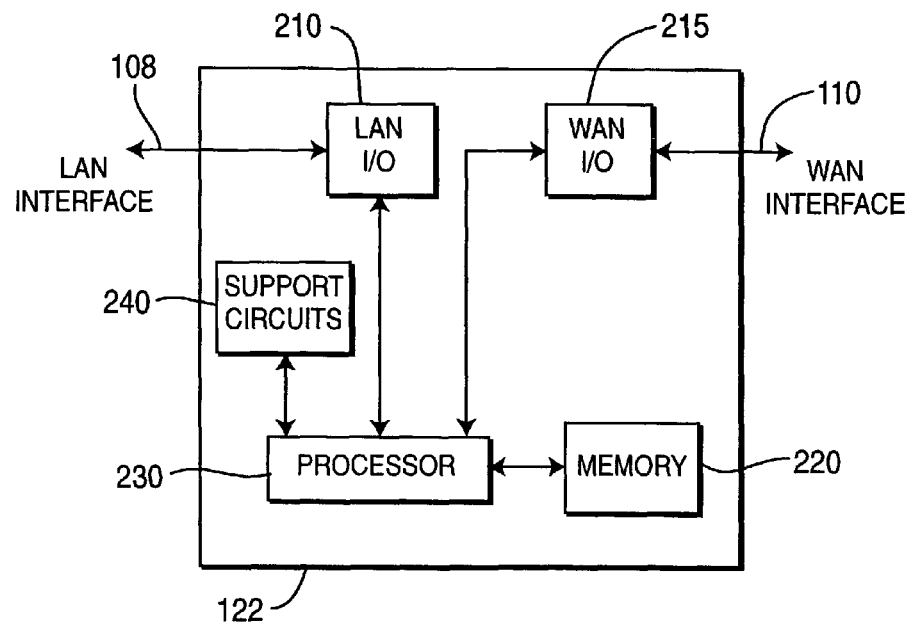
FIG. 2 depicts a high-level block diagram showing one embodiment of a router suitable for use with the present invention.

FIG. 2 depicts a high-level block diagram showing one embodiment of a router 106 suitable for use with the present invention. The router 106 comprises a processor 230 as well as a memory 220 for storing information, such as software routines for executing a method of adaptively configuring the router 106 to the statically configured network device 104. The processor 230 cooperates with conventional support circuitry 240, such as power supplies, clock circuits, cache memory, and the like, as well as circuits that assist in executing the software routines stored in the memory 220. Of course, some of the process steps discussed herein as software processes can be implemented within hardware, for example, circuitry that cooperates with the processor 230 to perform various steps. The router 106 also includes LAN input/output (I/O) circuitry 210 and WAN input/output circuitry 215, for forming an interface between the various functional elements communicating with the router 106. For example, in the embodiment of FIG. 1, the router 106 communicates with the client devices 102 and 104 of the LAN 103, as well as the WAN 114.

Although the router 106 of FIG. 2 depicts a general-purpose processor 230 that is programmed to perform various control functions in accordance with the present invention, the invention can be implemented in hardware, for example, as an application specific integrated circuit (ASIC). As such, the process steps described herein are intended to be broadly interpreted as being equivalently performed by software, hardware, or a combination thereof.

Figure 3:
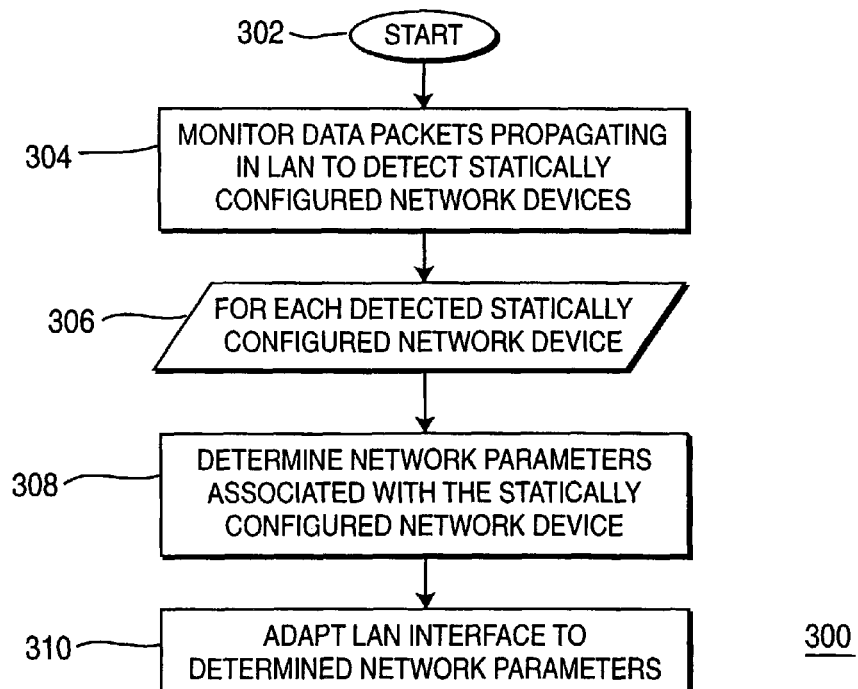
FIG. 3 depicts a flow diagram showing one embodiment of a method of adaptively configuring a router to a statically configured network device in accordance with the present invention.

FIG. 3 depicts a flow diagram showing one embodiment of a method 300 of adaptively configuring a router to a statically configured network device in accordance with the present invention. The method 300 begins at step 302 and continues to step 304, where the router 106 monitors data packets propagating within the LAN 103 to detect statically configured network devices. The method 300 proceeds to step 306 where, for each detected statically configured network device, the method performs steps 308 and 310. In step 308, the router 106 determines network parameters associated with the statically configured network device. In step 310, the router 106 adapts the LAN interface 108 to the determined network parameters to operatively couple the statically configured network device to the router 106. The method 300 ends at step 312.

Figure 4:
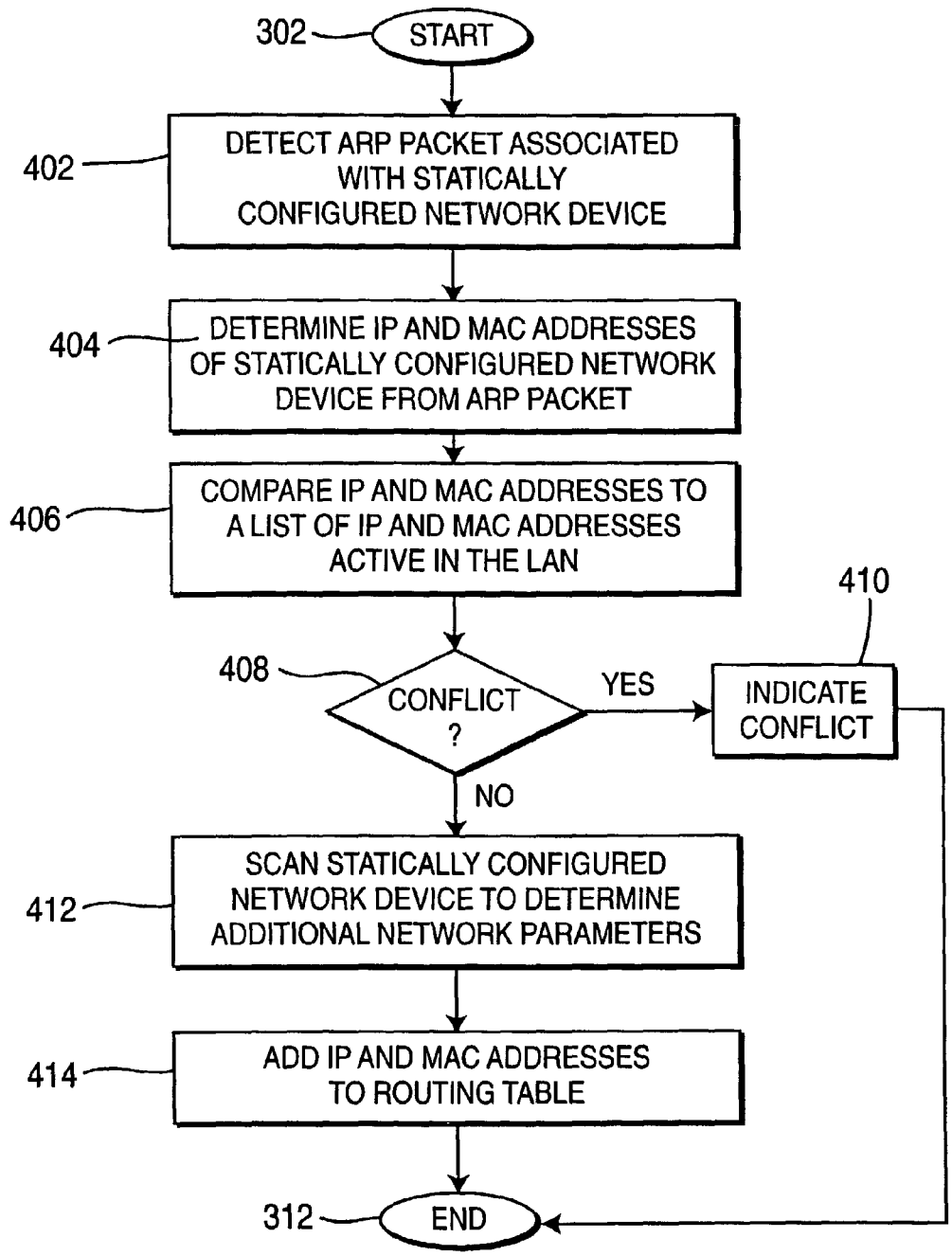
FIG. 4 depicts a more detailed flow diagram showing one embodiment of the method of FIG. 3.

FIG. 4 depicts a more detailed flow diagram showing one embodiment of the method 300 for a given statically configured network device. As shown, step 402 depicts one embodiment of step 304, and steps 404 through 414 depict one embodiment of steps 308 and 310. At step 402, the router 106 detects the statically configured network device by detecting address resolution protocol (ARP) packets associated with the statically configured network device. When a statically configured network device is coupled to the LAN 103, the device attempts to communicate to another networked device. In the case of a statically configured network device, there is no DHCP request, but rather the statically configured network device will send an ARP packet to the LAN 103 in order to communicate with other network devices. The router 106 scans the network traffic on the LAN 103 for the presence of this ARP packet transmitted by the statically configured network device. The ARP packet, for example, comprises a source MAC address, a source IP address, a destination IP address, and a broadcast MAC address. Although the present invention is described as detecting ARP packets, the present invention can use any type broadcast packets known in the art.

At step 404, the router 106 determines the IP and MAC addresses associated with the detected statically configured network device. In particular, the router 106 determines the IP and MAC addresses from the ARP or broadcast packet transmitted by the statically configured network device. At step 406, the router 106 compares the detected IP and MAC addresses to a list of active IP and MAC addresses in the LAN 103. At step 408, the router 106 determines whether there is a conflict between the statically configured network device and another device connected to the LAN 103. If there is a conflict, the method 300 proceeds to step 410, where the router 106 indicates the conflict. Absent a conflict, the method 300 proceeds to step 412.

At step 412, the router 106 scans the statically configured network device to determine additional network parameters associated therewith. As described above, these network parameters can include a subnet mask, a domain name, a host name, a gateway IP address, and one or more DNS IP addresses, these parameters being in addition to the determined IP and MAC addresses. For example, the router 106 can transmit an internet control message protocol (ICMP) address mask request to the statically configured network device to determine the subnet mask. The router 106 can port scan the statically configured network device to determine additional parameters, for example, whether any ports need to be opened to support servers that the device is running. At step 414, the router 106 adds the determined IP and MAC addresses for the statically configured network device to the routing table. The router 106 is now configured to operatively couple the statically configured network device to the LAN 103, as well as other networks through the WAN 114.

While the foregoing is directed to the preferred embodiment of the present invention, other and further embodiments of the invention may be devised without departing from the basic scope thereof, and the scope thereof is determined by the claims that follow.

The invention claimed is:

1. A configuration method, comprising:
   configuring an intermediate communication device in a network without user intervention, the intermediate communication device being neither an originating source or a final destination for communications passing there through,
   wherein said configuring step comprises:
      monitoring, by said intermediate communication device, data packets propagating in the network to detect a statically configured network device; and
      adapting, by said intermediate communication device, a network interface in the intermediate communication device to network parameters associated with the statically configured network device to operatively couple the statically configured network device to the intermediate communication device.

2. The method of claim 1, wherein the step of monitoring comprises at least one of:
- detecting an address resolution protocol (ARP) packet associated with the statically configured network device; and
- detecting a broadcast packet associated with the statically configured network device.

3. The method of claim 1, wherein the step of adapting comprises:
- determining an internet protocol (IP) address and a medium access control (MAC) address for the statically configured network device; and
- comparing the determined IP address and MAC address to a list of active IP and MAC addresses in the network.

4. The method of claim 3, wherein the step of adapting further comprises:
- adding the IP address and the MAC address for the statically configured network device to a routing table in the intermediate communication device.

5. The method of claim 4, wherein the step of adapting further comprises:
- scanning the statically configured network device to determine additional network parameters.

6. The method of claim 5, wherein the step of scanning comprises:
- transmitting an internet control message protocol (ICMP) address mask request to the statically configured network device.

7. An intermediate communication device, comprising:
- a memory for storing network parameters and instructions; and
- a processor, upon executing the instructions, configured to:
  - configure the intermediate communication device in a network without user intervention, the intermediate communication device being neither an originating source or a final destination for communications passing there through,
  - wherein said processor configures the intermediate communication device by:
    - monitoring data packets propagating in the network to detect a statically configured network device; and
    - adapting a network interface in the intermediate communication device to network parameters associated with the statically configured network device to operatively couple the statically configured network device to the intermediate communication device.

8. The network communication device of claim 7, wherein the processor is further configured to perform at least one of:
- detect an address resolution protocol (ARP) packet associated with the statically configured network device; and
- detect a broadcast packet associated with the statically configured network device.

9. The network communication device of claim 7, wherein the processor is further configured to:
- determine an internet protocol (IP) address and a medium access control (MAC) address for the statically configured network device; and
- compare the determined IP address and MAC address to a list of active IP and MAC addresses in the network.

10. The network communication device of claim 9, wherein the processor is further configured to:
- add the IP address and the MAC address for the statically configured network device to a routing table in the intermediate communication device.

11. The network communication device of claim 10, wherein the processor is further configured to:
- scan the statically configured network device to determine additional network parameters.

12. The network communication device of claim 11, wherein the processor is further configured to:
- transmit an internet control message protocol (ICMP) address mask request to the statically configured network device.

13. A computer readable medium for storing a set of instructions that, when executed by a processor, cause the processor to perform a configuration method, the method steps comprising:
- configuring an intermediate communication device in a network without user intervention, the intermediate communication device being neither an originating source or a final destination for communications passing there through,
- wherein said configuring step comprises:
  - monitoring, by said intermediate communication device, data packets propagating in the network to detect a statically configured network device; and
  - adapting, by said intermediate communication device, a network interface in the intermediate communication device to network parameters associated with the statically configured network device to operatively couple the statically configured network device to the intermediate communication device.

14. The computer readable medium of claim 13, wherein the step of monitoring comprises at least one of:
- detecting an address resolution protocol (ARP) packet associated with the statically configured network device; and
- detecting a broadcast packet associated with the statically configured network device.

15. The computer readable medium of claim 13, wherein the step of adapting comprises:
- determining an internet protocol (IP) address and a medium access control (MAC) address for the statically configured network device; and
- comparing the determined IP address and MAC address to a list of active IP and MAC addresses in the network.

16. The computer readable medium of claim 15, wherein the step of adapting further comprises:
- adding the IP address and the MAC address for the statically configured network device to a routing table in the intermediate communication device.

17. The computer readable medium of claim 16, wherein the step of adapting further comprises:
- scanning the statically configured network device to determine additional network parameters.

18. The computer readable medium of claim 17, wherein the step of scanning comprises:
- transmitting an internet control message protocol (ICMP) address mask request to the statically configured network device.

19. An intermediate communication device, comprising:
- means for configuring the intermediate communication device in a network without user intervention, the intermediate communication device being neither an originating source or a final destination for communications passing there through,
- wherein said configuring means comprises:
  - means for monitoring data packets propagating in the network to detect a statically configured network device; and
  - means for adapting a network interface in the intermediate communication device to network parameters associated with the statically configured network device to operatively couple the statically configured network device to the intermediate communication device.

* * * * *